Oct. 9, 1951 W. R. GERRY 2,571,028
MULTIPLE PURPOSE DOUBLE-ACTING LEVER
Filed July 18, 1949

INVENTOR.
William R. Gerry
BY
ATTORNEY.

Patented Oct. 9, 1951

2,571,028

UNITED STATES PATENT OFFICE 2,571,028

MULTIPLE PURPOSE DOUBLE-ACTING LEVER

William R. Gerry, Kalamazoo, Mich., assignor to Shakespeare Products Company, Kalamazoo, Mich.

Application July 18, 1949, Serial No. 105,346

7 Claims. (Cl. 74—471)

This invention relates to improvements in double acting levers.

The principal objects of this invention are:

First, to provide a lever and supporting structure therefor adapted to selectively actuate a plurality of mechanisms independently of each other upon movement of the lever in opposite directions from a neutral position.

Second, to provide a lever having the above advantages which is inexpensive to manufacture and which is highly resistant to wear.

Third, to provide a double action lever and supporting structure having cooperative detents for selectively positioning the lever and in which the detents are widely spaced from the pivot axes of the lever to firmly resist movement of the lever out of the detents.

Fourth, to provide a lever and support having a pair of selectively operative alternate spaced pivot points whereby oppositely extending arms of the lever are operative to move independently of each other for selectively actuating two or more mechanisms.

Other objects and advantages relating to details of my lever will be apparent from a consideration of the following description and claims. The drawings, of which there is one sheet, illustrate a preferred form of my lever and mounting mechanism.

My lever and support are primarily designed for use in actuating two mechanisms such as a cold air damper and a warm air damper in the ventilating system of an automobile from a point remote from the dampers. However, my lever obviously can be used in other connections where it is desired to selectively actuate one of a plurality of mechanisms to the exclusion of other mechanisms. My lever and support consist generally of a flat supporting plate 1 having a downturned attaching flange 2 along the forward edge thereof. The attaching flange 2 is adapted to be bolted to a convenient supporting structure such as the instrument panel of an automobile and the flat portion of the support plate movably supports the center portion 3 of a lever having the forwardly projecting actuating arm 4.

Figure 5:
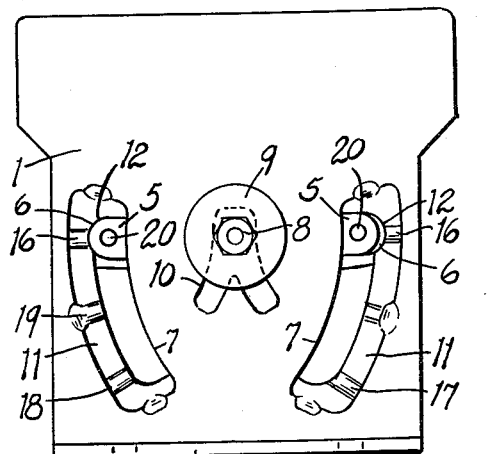
Fig. 5 is a bottom plan view of the support and the lever.

The central portion 3 of the lever is provided with oppositely extending arms 5—5 which are positioned in flat sliding relationship with the front surface of the support plate 1 as is also the central portion 3. The ends of the arms 5 are rounded as is best illustrated at 6 in Fig. 5 to form bearing surfaces cooperative with the outer edges of arcuate slots 7—7 formed in the support plate 1. The lever is movably retained on the support plate by means of a central bolt 8 and washer 9. The bolt 8 extends through and is laterally movable in a V-shaped opening 10 in the support plate.

The arcuate slots 7—7 are desirably formed in the support plate 1 by stamping or otherwise pressing arcuate portions 11—11 forwardly from the general plane of the plate and cutting away the inner adjacent edges of the raised portions. As is most clearly illustrated in Fig. 4 the rear ends of the slots 7 away from the mounting flange 2 are provided with outwardly extending pivot recesses 12 adapted to receive the rounded ends 6 of the lever arms 5. The arcuate slots 7 and raised portions 11 are concentric about the center of the pivot recess of the other arcuate slot.

Figure 1:
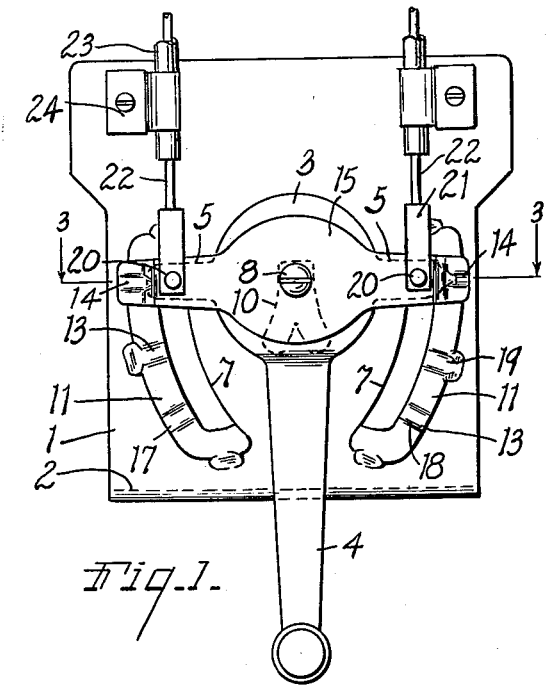
Fig. 1 is a plan view of the lever and its support with one control cable for operating a remotely located device connected to the lever.
Figure 4:
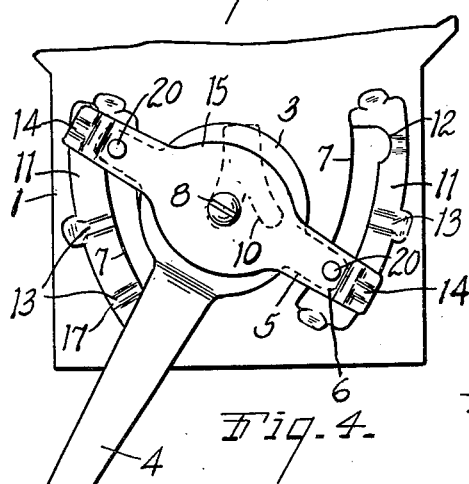
Fig. 4 is a fragmentary plan view of the lever and support with the lever at one extreme operated position from its intermediate neutral position.

The raised portions 11—11 are further formed with radially extending keepers 13 which are cooperative with the rib-like detents 14 on the ends of a leaf spring 15. The leaf spring 15 is secured to the top of the central portion 3 of the lever by the bolt 8. The keepers 13—13 can be formed at any desired position along the raised portions of the plate and in the example illustrated I have shown a pair of "off" or neutral position keepers 16—16 which are simultaneously engageable by both of the keepers 14 in the neutral position of the lever. The left raised portion 11 as viewed in Figs. 1 and 4 is provided with one other keeper corresponding to an "on position" of a device to be controlled as at 17. The right raised portion 11 is provided with an "on" keeper 18 and an intermediate or "half on" keeper 19.

Figure 2:
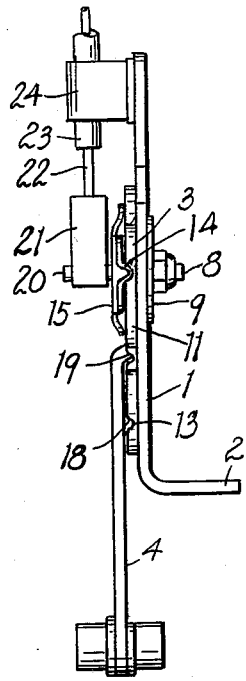
Fig. 2 is a side elevational view of the lever illustrated in Fig. 1.
Figure 3:
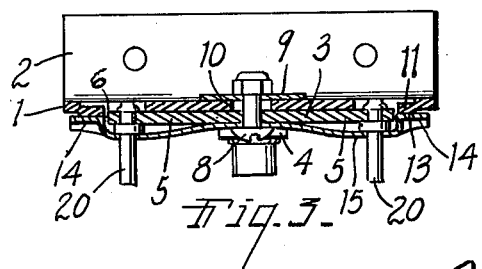
Fig. 3 is a cross sectional view taken along the plane of the line 3—3 in Fig. 1 and looking in the direction of the arrows.

Secured to each of the laterally extending arms 5 of the lever and projecting upwardly through the leaf spring 15 is a pin 20. The pins are preferably positioned over the slots 7 so that the riveted under ends of the pins will ride in the slots without interfering with the movement of the lever. Thus mounted the spring in effect provides each lateral arm of the lever with a spring biased detent. The pins 20—20 are adapted to be connected to couplings one of which is shown at 21 in Figs. 1 and 2, the couplings being secured to the transmission wires or elements 22 of flexible control cables 23. The outer stationary case of the control cable may be conveniently secured to the support plate 1 by a clip 24.

From the foregoing description it should be apparent that as the lever actuating arm 4 is moved laterally the rounded end 6 of the lateral arm 5 facing in the direction of movement of the actuating arm of the lever will be moved into the pivot notch 12 in the edge of the slot towards which the lever actuating arm 4 is moved. Continued movement of the actuating arm 4 will cause it to pivot about the engaged end 6 with the opposite arm 5 of the lever moving along the opposite arcuate slot. The ends of the spring 15 will then be moved along the raised portion 11 into the locating keeper 13 in that raised portion. Fig. 4 illustrates the lever in an extreme clockwise rotated position.

I have illustrated and described my invention in a highly practical embodiment thereof. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent is:

1. A double throw lever comprising, a support plate having concave converging opposingly arcuate portions offset from the plane thereof by approximately the thickness of said plate, the inner edges of said concave portions being cut away along arcuate slots with radially outwardly extending pivot recesses in the diverging ends thereof, each concave portion and arcuate slot being concentric about the recess in the other slot, a lever having an actuating arm and a central portion disposed upon said support plate and having oppositely extending lateral arms with rounded ends engageable with the outer edges of said arcuate slots, a bolt disposed through the central portion of said lever and said support plate and having a washer on the rear side of said plate for retaining said lever on said plate, said support plate defining a V-shaped opening receiving said bolt, the branches of the V being concentric with respect to said pivot recesses, a leaf spring secured to said lever by said bolt and having oppositely extending arms overlapping the ends of the lateral arms on said lever and bearing against the arcuate portions of said support plate, said arcuate portions and the ends of said spring forming coacting detents and keepers, and pins projecting normally from the lateral arms and located along said arcuate slots, said pins forming actuating abutments for control cables and passing through said spring to prevent relative rotation between said spring and said lever.

2. A double throw lever comprising, a support plate having concave converging opposingly concave arcuate portions offset from the plane thereof by approximately the thickness of said plate, the inner edges of said concave portions being cut away along arcuate slots with radially outwardly extending pivot recesses in the diverging ends thereof, each concave portion and arcuate slot being concentric about the pivot recess of the other slot, a lever having an actuating arm, a central portion on said lever disposed upon said support plate and having oppositely extending lateral arms slidably engaged at their outer ends with the edges of said arcuate slots, a bolt carried by the central portion of said lever and slidably engaging said support plate for holding said lever on said plate, said support plate forming an opening receiving said bolt, said opening having edges concentric with respect to said pivot recesses, a leaf spring secured to said lever by said bolt and having oppositely extending arms overlapping the ends of the lateral arms on said lever and bearing against the arcuate portions of said support plate, said arcuate portions and the ends of said spring forming coacting detents and keepers, and pins projecting normally from the lateral arms and located along said arcuate slots, said pins forming actuating abutments for control cables and passing through said spring to prevent relative rotation between said spring and said lever.

3. A lever structure comprising, a support plate having converging opposingly arcuate portions offset therefrom, the inner edges of said concave portions being cut away along arcuate slots with outwardly extending pivot recesses in the divergent ends thereof, each concave portion and arcuate slot being concentric about the divergent end of the other slot, a lever having an actuating arm and a central portion disposed upon said support plate and having laterally extending arms slidably engaging the edges of said arcuate slots, a bolt carried by the lever and engaging said support plate, said support plate defining an opening receiving said bolt for lateral movement thereof, a spring secured to said lever and having oppositely extending arms overlapping the ends of the lateral arms of said lever and bearing against said support plate, said support plate and the ends of said spring having coacting detents and keepers, and means projecting from the lateral arms of said lever constituting actuating abutments for control elements and passing through said spring to prevent relative rotation between said spring and said lever.

4. A lever structure comprising, a support having converging opposing arcuate portions offset from the plane thereof, the inner edges of said arcuate portions being cut away along arcuate slots, each concave portion and arcuate slot being concentric about the divergent end of the other slot, a lever having an actuating arm and a central portion disposed upon said support plate and having laterally extending arms slidably engaging the offset edges of said arcuate slots, a bolt connecting said lever and said support and slidably engaging said support to retain said lever on said support with the laterally extending arms between the offset edges of said slots, and a spring mounted on said lever and having oppositely extending arms overlapping the ends of the lateral arms on said lever and bearing against said support, said support and the ends of said spring having coacting detents and keepers, the central portion and laterally extending arms of said lever lying against said support within the plane embraced by the offset of said arcuate portions.

5. A multiple purpose lever comprising, a support having converging opposingly concave rails offset from the plane of said support between said rails, the inner edges of said rails having radially outwardly extending pivot recesses in the divergent ends thereof, each rail being concentric about the pivot recess in the other rail, a lever disposed entirely upon one side of said support and having laterally extending arms with rounded ends slidably engageable with said rails, a bolt carried by said lever and connecting the same to said support, said support having an opening for said bolt, a spring detent carried by said lever, said support having coacting keepers engageable by said spring, and means carried by the lateral arms of said lever for attachment of control elements thereto.

6. A multiple purpose lever comprising, a support plate having converging opposingly concave rails thereon, said rails having pivot recess at the divergent ends thereof, each rail being concentric about the pivot recess in the other rail, a lever disposed upon one side only of said support and having laterally extending arms with ends slidably engaging the rails, a bolt carried by said lever and having lateral sliding engagement with said support plate, and spring biased detents operatively associated with said lateral arms, said support having coacting keepers engageable by said spring and said arms being adapted to have control elements connected thereto.

7. In a structure of the class described, the combination of a support plate having oppositely disposed converging arcuate rails offset from the plane of the plate between said rail, each rail being concentric about the divergent end of the other rail, a lever slidably mounted entirely on one side of said supporting plate centrally between said rails and having laterally extending arms with ends slidably engaging said rails, there being means at the diverging ends of said rails with which the coacting arm is swingable engageable and constituting pivots for the lever when the arms are in engagement therewith.

WILLIAM R. GERRY.

REFERENCES CITED

The following references are of record in the file of this patent:

UNITED STATES PATENTS

| Number | Name | Date |
|---|---|---|
| 1,036,914 | Seaman | Aug. 27, 1912 |
| 2,115,245 | Allison | Apr. 26, 1938 |
| 2,465,720 | Flamm | Mar. 29, 1949 |

FOREIGN PATENTS

| Number | Country | Date |
|---|---|---|
| 168,241 | Great Britain | Sept. 1, 1921 |